United States Patent [19]
Kaylo et al.

[11] Patent Number: 6,033,545
[45] Date of Patent: Mar. 7, 2000

[54] ELECTROCOATING PROCESSES AND COMPOSITIONS CONTAINING POLYSILOXANE CRATER CONTROL AGENTS

[75] Inventors: Alan J. Kaylo, Glenshaw; Truman F. Wilt, Clinton, both of Pa.

[73] Assignee: PPG Industries Ohio, Inc., Cleveland, Ohio

[21] Appl. No.: 08/986,812

[22] Filed: Dec. 8, 1997

[51] Int. Cl.[7] .................... C08F 2/58; C09D 5/44; C25D 13/00; C25D 15/00
[52] U.S. Cl. ............................... 204/489; 528/31
[58] Field of Search .................... 204/489, 493, 204/500, 501; 205/317, 413, 549; 522/99; 528/31, 15

[56] References Cited

U.S. PATENT DOCUMENTS

| | | | |
|---|---|---|---|
| 4,431,789 | 2/1984 | Okazaki et al. | 528/15 |
| 4,432,850 | 2/1984 | Moriarity et al. | 204/181 C |
| 4,891,111 | 1/1990 | McCollum et al. | 204/181.7 |
| 5,248,789 | 9/1993 | Wolff | 549/215 |
| 5,260,469 | 11/1993 | Swiatek | 556/445 |
| 5,268,256 | 12/1993 | Goetz et al. | 430/284 |
| 5,427,661 | 6/1995 | Geist et al. | 204/181.7 |
| 5,501,779 | 3/1996 | Geist et al. | 904/501 |
| 5,599,883 | 2/1997 | Ohsugi et al. | 525/474 |
| 5,756,221 | 5/1998 | Horibe et al. | 428/686 |

OTHER PUBLICATIONS

Carey, Francis A., Organic Chemistry, 2nd Ed., McGraw Hill, pp. 196–197, 684–685. No month available, 1992.

"Synthesis of Novel Organic Oligomers Containing Si–H Bonds", T. Iwahara, M. Kusakabe, M. Chiba and K. Yonezawa, Journal of Polymer Science: Part A: Polymer Chemistry, vol. 31, pp. 2617–2631 (1993), John Wiley & Sons, Inc. No month available.

English Abstract: JP 61115974 A, Nippon Paint Co., Ltd., "Cationic electro–deposition coating composn.– . . . ", Jun. 03, 1986.

English Abstract: JP 4819941 / JP 73019941 B, Jun. 18, 1968.

*Primary Examiner*—Kathryn Gorgos
*Assistant Examiner*—Wesley A. Nicolas
*Attorney, Agent, or Firm*—William J. Uhl

[57] ABSTRACT

Disclosed are electrodepositable coating compositions containing novel polysiloxanes which are the reaction product of a polysiloxane containing silicon hydride and at least one material which contains one or more unsaturated bonds capable of undergoing hydrosilylation reaction. The electrodepositable coating compositions can be anionic or cationic electrodepositable coatings and are resistant to cratering. Also disclosed is a method of electrocoating a conductive substrate using the electrodepositable coating compositions of the invention. Novel low molecular weight polysiloxanes having pendant groups which contain unsaturated bonds capable of undergoing hydrosilylation reaction are also disclosed.

24 Claims, No Drawings

ELECTROCOATING PROCESSES AND COMPOSITIONS CONTAINING POLYSILOXANE CRATER CONTROL AGENTS

BACKGROUND OF THE INVENTION

The present invention relates to electrocoating compositions containing a resinous phase dispersed in an aqueous medium, the resinous phase comprising an ionic electrodepositable resin and a novel polysiloxane component, and to their use in the method of electrodeposition. More particularly, this invention relates to electrocoating compositions which have improved crater resistance.

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Although surface coatings of excellent quality can be achieved by means of cationic electrodeposition, a problem associated with this means of coating is the development of surface defects upon curing, particularly craters. The cause of such surface defects can be a result of the very nature of the components of the electrocoating composition, that is, causes inherent in the system. Typically, however, the cause of such surface defects is the impurities which are carried into the electrocoating bath with the workpiece. Examples of such impurities can include lubricating oil, anti-corrosion grease, joint sealing compounds and the like.

As the electrocoating composition is deposited onto the conductive substrate, the impurities are carried along with the coating composition and are deposited as well. When the coated substrate is cured, craters are formed due to incompatibility between the impurity and the resinous phase of the electrocoating composition.

The use of silicone additives such as SILWET L-7602, a silicone oil commercially available from OSi Specialties, a subsidiary of Whitco Corporation, to prevent crater formation is well known in the art. Although these silicone additives are quite effective for crater control in electrocoating compositions, they also pose the serious disadvantage of intercoat adhesion failure of subsequently applied coating layers.

Japanese Patent Application J61,115,974 discloses the addition of a reaction product formed from a polyepoxide resin modified with dimeric fatty acids and a polyoxyalkylene polyamine to cationic electrocoating compositions to suppress crater formation. These products, however, can result in intercoat adhesion failure of subsequently applied primers and/or topcoats. U.S. Pat. No. 4,432,850 discloses the addition of a reaction product of a polyepoxide resin with a polyoxylene-polyamine containing primary amino groups to cationic electrocoating compositions to eliminate or minimize crater formation. However, to achieve maximum effectiveness as a crater control additive, this polyepoxide-polyoxyalkylenepolyamine resin sometimes must be added at quite high levels (i.e., 0.5 to 40 percent by weight), thereby diluting the properties of the other film-forming cationic resins which are present in the electrodepositable coating composition.

U.S. Pat. Nos. 5,427,661 and 5,501,779, both to Geist et al., disclose the addition of a homopolymer or copolymer of an alkyl vinyl ether to cationic electrocoating compositions to suppress the occurrence of craters in the deposited surface coating materials. Such alkyl vinyl ether materials provide adequate crater control while overcoming the intercoat adhesion failure observed with the above-mentioned crater control additives. However, these alkyl vinyl ether materials can impart the tendency in a coating to telegraph solvent wipe marks and negatively affect wettability of a subsequently applied primer or topcoat.

Polysiloxane polyols are well known in the art. Japanese Patent Publication 48-19941 describes polysiloxane polyols which are obtained by the dehydrogenation reaction between a polysiloxane hydride and an aliphatic polyhydric alcohol or polyoxyalkylene alcohol to introduce the alcoholic hydroxy groups onto the polysiloxane backbone. These polysiloxane polyols are disclosed as being useful as non-ionic surface active agents.

U.S. Pat. No. 4,431,789 to Okazaki et al. discloses a polysiloxane polyol which is obtained by the hydrosilylation reaction between a polysiloxane containing silicon hydride and a polyglycerol compound having an aliphatically unsaturated linkage in the molecule. Examples of such polyglycerol compounds are those obtained by the reaction of allyl alcohol and glycidol or by the reaction of diglycerin and allyl glycidyl ether. This reaction, a so-called hydrosilylation reaction, is an addition reaction between an organosilicon compound having a hydrogen atom directly bonded to the silicon atom, i.e., a polysiloxane hydride, and an organic compound having aliphatic unsaturation in the molecule carried out in the presence of a catalytic amount of a Group VIII noble metal. The resulting polysiloxane polyols are also useful as non-ionic surface active agents.

U.S. Pat. No. 5,260,469 discloses butoxylated polysiloxane polyols which are disclosed as being useful in cosmetics. U.S. Pat. No. 5,248,789 discloses epoxy functional polysiloxanes which are formed by reacting a polysiloxane-containing silicon hydride with allyl glycidyl ether. Due to their high refractive indices, the resulting epoxy-functional polysiloxanes are useful as components in high gloss coatings and optical coupler adhesives.

U.S. patent application Ser. No. 08/904598 discloses organic polysiloxane polyols obtained by the hydrosilylation reaction of a silicon hydride containing polysiloxane with an alkenyl polyoxylene alcohol. Such polysiloxane polyols are useful in coating compositions where they provide improved mar resistance and cure response. U.S. patent application Ser. No. 08/904596 discloses acetoacetate functional polysiloxanes obtained by the transesterification of the polysiloxane polyols described immediately above with an acetoacetate. These acetoacetate functional polysiloxanes are useful in ambient-cured coating compositions which also contain a polyketimine crosslinker. U.S. patent application Ser. No. 08/904597 discloses coating compositions which comprise organic polysiloxanes which can have pendant groups containing a variety of reactive functional groups such as OH, COOH, NCO, carboxylate such as ester, carbonate and anhydride, primary amine, secondary amine, amide, carbamate and epoxy, functional groups. These functional polysiloxanes, when combined with curing agents, provide thermosetting coatings with good physical properties.

The prior art references do not teach the use of either the polysiloxane polyols or their derivatives as components in electrocoating compositions to provide improved crater control. Moreover, there is no reference which disclosed the hydosilylation of a low molecular weight polysiloxane containing silicon hydride with materials containing multiple unsaturated bonds to provide groups pendant from the polysiloxane backbone, which contain unsaturated bonds capable of undergoing hydrosilylation reaction.

It, therefore, would be advantageous to provide an electrocoating composition which suppresses or eliminates the occurrence of surface defects such as craters, without adversely affecting intercoat adhesion of primers and/or topcoats which may be subsequently applied to the deposited coating material. It would also be advantageous to provide low molecular weight polysiloxanes having pendant groups containing one or more unsaturated bonds capable of undergoing hydrosilylation reaction.

SUMMARY OF THE INVENTION

In accordance with the present invention, an electrodepositable coating composition comprising a resinous phase dispersed in an aqueous medium is provided. The resinous phase comprises the following components:

(a) an ionic electrodepositable resin; and
(b) a polysiloxane which is the ungelled reaction product of the following reactants:
  (i) a polysiloxane containing silicon hydride represented by the general formula:

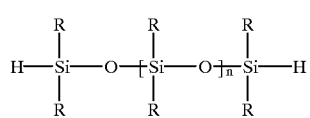

(I)

wherein the R groups are monovalent hydrocarbon groups connected to the silicon atoms, and n is 0 to 100; and
  (ii) at least one material which contains one or more unsaturated bonds capable of undergoing hydrosilylation reaction.

Provided, also, is a method of electrocoating a conductive substrate serving as a charged electrode in an electrical circuit comprising said electrode and an oppositely charged counter electrode which are immersed in the aqueous electrocoating composition of the present invention which is described immediately above, the method of electrocoating comprising passing electric current between the electrodes to cause the deposition of the electrocoating composition on the substrate as a substantially continuous film. Additionally provided is a polysiloxane which is the reaction product of the polysiloxane containing silicon hydride of formula (I) wherein the R groups are as described above for that structure and n is 0 to 5; and at least one material which contains two or more unsaturated bonds capable of undergoing hydrosilylation reaction.

DETAILED DESCRIPTION OF THE INVENTION

Generally, the electrodepositable coating composition of the present invention comprises a resinous phase dispersed in an aqueous medium wherein the resinous phase comprises the following components:

(a) a ionic electrodepositable resin; and
(b) a polysiloxane which is the ungelled reaction product of the following reactants:
  (i) a polysiloxane containing silicon hydride represented by the general formula (I), wherein R and n are as defined above for that structure; and
  (ii) at least one material which contains one or more unsaturated bonds capable of undergoing hydrosilylation reaction.

It should be appreciated that the various R groups can be the same or different, and it is usually the case that the R groups will be mixed groups or entirely monovalent hydrocarbon groups.

By monovalent hydrocarbon groups is meant organic groups containing essentially carbon and hydrogen. The hydrocarbon groups may be aliphatic, aromatic, cyclic or acyclic and may contain from 1 to 24 (in the case of aromatic from 3 to 24) carbon atoms. Optionally, the hydrocarbon groups may be substituted with heteroatoms, typically oxygen. Examples of such monovalent hydrocarbon groups are alkyl, alkoxy, aryl, alkaryl or alkoxyaryl groups.

By "ungelled" is meant the reaction products are substantially free of crosslinking and have an intrinsic viscosity when dissolved in a suitable solvent. The intrinsic viscosity of the reaction product is an indication of its molecular weight. A gelled reaction product, on the other hand, since it is of essentially infinitely high molecular weight, will have an intrinsic viscosity too high to measure.

It should be noted that the level of unsaturation contained in reactant (ii) is selected to ensure an ungelled reaction product. In other words, a higher average value of Si—H functionality requires that reactant (ii) have a lower level of unsaturation. When the average value of Si—H functionality is greater than two, reactant (ii) preferably should contain only one unsaturated bond to avoid gelation. Examples of materials suitable for use as reactant (ii) when the average value of Si—H is greater than two include trimethylolpropane monoallylether; pentaerythritol monoallylether; vinyl cyclohexane diol; polypropoxylated allyl alcohol, styrene and 3-isopropenyl-α,α-dimethylbenzyl isocyanate.

Preferably, the polysiloxane containing silicon hydride, reactant (i), is a low molecular weight material where n is 0 to 5. Examples of the preferred polysiloxanes containing silicon hydride include 1,1,3,3,-tetramethyl disiloxane where n is 0 and the average Si—H functionality is two, and the polymethyl polysiloxane containing silicon hydrides where n is 4 to 5 and the average Si—H functionality is two or less, commercially available from PPG Industries, Inc. as MASIL WAX BASE 135. When n is 0 to 5 and the average Si—H functionality is two or less, reactant (ii) can contain two or more, preferably two, unsaturated bonds capable of undergoing hydrosilylation reaction without the occurrence of gelation.

In a preferred embodiment of the invention, reactant (ii) contains at least two unsaturated bonds in the terminal position. Examples of suitable materials which contain at least two terminal, unsaturated bonds which are capable of undergoing hydrosilylation reaction include trimethylolpropane diallylether; divinyl benzene; pentaerythritol diallylether; trimethylpentane diol diallylether; 3,9,-divinyl-2,4,8,10-tetraoxaspiro[5.5]undecane and mixtures thereof.

In yet another preferred embodiment of the invention, reactant (ii) is represented by the following general formula:

(II)

wherein $R_1$ is selected from the group consisting of alkenyl, oxyalkenyl, and alkenyl aryl; and X is a group represented by the general formula:

O—Y wherein Y is a group represented by the general formula:

$$R_2\text{---}(CH_2\text{---}OH)_p, \quad (III)$$

where p is 1,
$R_2$ is

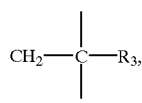

and where $R_3$ is a group containing one or more unsaturated bonds capable of undergoing hydrosilylation reaction.

In the preferred embodiment of the invention, the polysiloxane (b) is the ungelled reaction product of (i) a polysiloxane containing silicon hydride represented by the structure (I) where R is as defined above for that structure, and n is 0 to 5; and (ii) at least one material which is represented by the structure (II) and which contains at least two, preferably two terminal, unsaturated bonds capable of undergoing hydrosilylation.

By alkenyl is meant acyclic or cyclic alkenyl groups having a carbon chain length of from $C_2$ to $C_{25}$. Examples of suitable alkenyl groups are those derived from propene, butene, pentene, 1-decene, isoprene, myrcene and 1-heneicosene. By oxyalkenyl is meant an alkenyl group containing at least one ether oxygen atom and having a carbon chain length of from $C_2$ to $C_{25}$, preferably an allyl group of from $C_2$ to $C_4$. Examples of suitable oxyalkenyl groups are those associated with trimethylolpropane monoallylether, pentaerythritol monoallylether, trimethylolpropane diallylether, polyethoxylated allyl alcohol and. By alkenyl aryl is meant an acyclic alkenyl group containing at least one aryl group, preferably phenyl, and having an alkenyl carbon chain length of from $C_2$ to $C_{25}$. The aryl group may optionally be substituted. Suitable substituent groups may include hydroxyl, benzyl, carboxylic acid and aliphatic groups. Examples of suitable alkenyl aryl groups include those associated with styrene and 3-isopropenyl-α, α-dimethylbenzyl isocyanate.

The polysiloxane of the present invention is prepared via the hydrosilylation reaction of the polysiloxane containing silicon hydride and a material containing one or more unsaturated bonds capable of undergoing hydrosilylation reaction. Typically, the material containing one or more unsaturated bonds is added at ambient temperatures to a reaction vessel equipped with a means for maintaining a nitrogen blanket. Added concurrently is about from 20 to 25 ppm of a metal acetate salt to inhibit the possible undesirable side reactions such as those associated with acetal condensation via an alkenyl ether moiety. The temperature is increased to about 75° C. under a nitrogen blanket at which time about 5% of the polysiloxane containing silicon hydride is added under agitation. A catalytic amount of a Group VIII noble metal, preferably chloroplatinic acid, is added and the reaction is permitted to exotherm to about 95° C. Addition of the remaining portion of the polysiloxane containing silicon hydride is completed as the reaction temperature is maintained at 95° C. and the reaction is monitored by infrared spectroscopy for disappearance of the silicon hydride absorption band (Si—H: 2150 cm$^{-1}$). It should be noted that the a small amount of material containing only one unsaturated bond in conjunction with a material containing two or more unsaturated bonds helps to ensure an ungelled reaction product. Molecular weight may also be controlled by using an excess of diallylic material relative to the amount of Si—H present in the polysiloxane containing silicon hydride.

Besides the aforementioned polysiloxanes, the electrodepositable coating compositions of the present invention also contain, as a main film-forming polymer, an ionic, preferably cationic, electrodepositable resin. A wide variety of electrodepositable film-forming polymers are known and can be used in the electrodepositable coating compositions of the invention so long as the polymers are "water dispersible," i.e., adapted to be solubilized, dispersed or emulsified in water. The water dispersible polymer is ionic in nature, that is, the polymer will contain anionic functional groups to impart a negative charge or, as is preferred, cationic functional groups to impart a positive charge.

Examples of film-forming resins suitable for use in anionic electrodepositable coating compositions are base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxyalkyl esters of unsaturated carboxylic acids, unsaturated carboxylic acid and at least one other ethylenically unsaturated monomer. Still another suitable electrodepositable resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13, all of which are herein incorporated by reference. Other acid functional polymers can also be used such as phosphatized polyepoxide or phosphatized acrylic polymers as are well known to those skilled in the art.

As aforementioned, it is preferred that the ionic electrodepositable resin (a) is capable of deposition on a cathode. Examples of such cationic film-forming resins include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, these amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins such as those described in U.S. Pat. Nos. 3,455,806 and 3,928,157.

Besides amine salt group-containing resins, quaternary ammonium salt group containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, film-forming resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,116,900. In U.S. Pat. No. 3,947,339, a polyketimine derivative of a polyamine such as diethylenetriamine or triethylenetetraamine is reacted with a polyepoxide. When the reaction product is neutralized with acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The ionic electrodepositable resin described above is present in the electrocoating composition in amounts of about 1 to about 60 percent by weight, preferably about 5 to about 25 based on total weight of the electrodeposition bath.

The aqueous compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. The novel polysiloxane of the present invention is typically present in the resinous phase in an amount of from about 0.1 to about 10 percent, preferably from about 0.1 to about 2 percent by weight based on total weight of the resinous phase. When the compositions of the present invention are in the form of resin concentrates, they generally have a resin solids content of about 20 to about 60 percent by weight based on weight of the aqueous dispersion.

Electrodeposition baths are typically supplied as two components: (1) a clear resin feed, which includes generally the ionic electrodepositable resin, i.e., the main film-forming polymer, and/or crosslinker and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

It should be appreciated that there are various methods by which the polysiloxane component can be incorporated into the electrodeposition bath. The polysiloxane component may be added "neat," that is, added directly to the bath without prior blending or reacting with other components. Alternately, the polysiloxane can be added to the predispersed clear resin feed which may include the ionic resin, the crosslinker and/or any other non-pigmented component. The polysiloxane can also be pre-blended with the pigment paste component prior to the incorporation of the paste to the electrodeposition bath. Also, the polysiloxane can be pre-reacted with any of the components of the clear resin feed or with any of the resinous components of the pigment paste. For example, when the polysiloxane component contains hydroxyl functional groups, it can be pre-reacted with a portion of an isocyanate crosslinker or any other component which contains functional groups which are reactive with hydroxy functional groups. Preferably, the polysiloxane is added to the predispersed clear resin feed or is pre-blended with the pigment paste component.

When the compositions of the present invention are in the form of electrodeposition baths, the resin solids content of the electrodeposition bath are usually within the range of about 5 to 25 percent by weight based on total weight of the electrodeposition bath. When the coating compositions of the invention are in the form of electrodeposition baths, the polysiloxane is typically present in an amount of about 50 to about 5000 parts per million, preferably about 50 to about 2000 parts per million, and even more preferably from about 100 to about 1500 parts per million based on electrodeposition bath weight.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

When the aqueous dispersions as described above are employed for use in electrodeposition, the aqueous dispersion is placed in contact with an electrically conductive anode and an electrically conductive cathode, with the surface to be coated being the cathode in cationic electrodeposition and the anode in anionic electrodeposition. As aforementioned, in the method of the present invention, it is preferred that the substrate serves as the cathode. Following contact with the aqueous dispersion, an adherent film of the coating composition is deposited on the substrate which is serving as an electrode when a sufficient voltage is impressed between the electrodes. The conditions under which electrodeposition is carried out are, in general, similar to those used in electrodeposition of other types of coatings. The applied voltage may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film. The electrodepositable coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Examples 1 through 5 describe the preparation of the novel polysiloxanes employed as crater control agents in the electrodepositable coating compositions of the present invention. Example 1 describes the optimized synthesis of a trimethylolpropane monoallyl/diallylether-tetramethyl disiloxane (TMDS) copolymer wherein the mono-unsaturated material ensures an ungelled reaction product. Example 2 describes the synthesis of a trimethylolpropane diallylether-TMDS copolymer with no addition of a mono-unsaturated material. Example 3 describes the preparation of a divinyl benzene-tetramethyl disiloxane copolymer and Examples 4 describes the preparation of a styrene-polymethyl polysiloxane oligomer. Example 5 describes the synthesis of a trimethylolpropane monoallylether-MASIL WAX copolymer. All of the reaction products of the following examples involved the hydrosilylation of a silicon hydride containing disiloxane or polysiloxane and a material containing at least one unsaturated bond capable of undergoing the hydrosilylation reaction.

Example AA describes the preparation of the pigment paste which is contained in Examples A through F which follow. Example AB describes the preparation of a cationic electrodepositable resin, the main film-forming polymer in the coating compositions of Examples A through F which follow. Example A describes the preparation of a cationic electrodepositable coating composition of the present invention which contains as a crater control agent the trimethylolpropane diallylether -TMDS copolymer of Example 2. Example B describes the preparation of a cationic electrodepositable coating composition of the present invention which contains the divinyl benzene-TMDS copolymer of Example 3 as a crater control agent. Example C describes the preparation of a cationic electrodepositable coating composition containing as a crater control agent the styrene-MASILWAX oligomer of Example 4, and Example D describes the preparation of a cationic electrodepositable coating composition containing the trimethylolpropane monoallylether-MASILWAX copolymer of Example 5 as a crater control additive. Comparative Examples E and F describe the preparation of cationic electrodepositable coating compositions which contain a commercial silicone oil as a crater control agent and no crater control agent, respectively. The following Table 1 illustrates the advantages of the cationic electrodepositable coating compositions containing the polysiloxanes as crater control agents for such properties as oil spot contamination resistance, topcoat-to-electrocoat adhesion, solvent telegraphing and wettability of the electrocoat by a subsequently applied primer or topcoat.

Example G and Comparative Example H describe the preparation of an anionic acrylic electrodepositable coating composition containing the trimethylolpropane monoallylether-MASILWAX copolymer of Example 5 as a crater control additive and the same electrodepositable coating composition containing no polysiloxane additive, respectively. The following Table 2 illustrates the advantage of the anionic electrodepositable coating composition containing the polysiloxane crater control agent for oil spot contamination resistance.

POLYSILOXANE CRATER CONTROL AGENTS

Example 1

This example describes the synthesis of a mixed trimethylolpropane monoallyl/diallylether-tetramethyldisiloxane copolymer. The copolymer was prepared from the following mixture of ingredients:

| Ingredients | Equivalent Weight | Equivalents | Parts By Weight (grams) |
|---|---|---|---|
| Charge I: | | | |
| Trimethylolpropane diallylether | 107.0 | 2.34 | 250.0 |
| Trimethylolpropane monoallylether | 174.0 | 0.2 | 34.80 |
| Charge II: | | | |
| 1,1,3,3-tetramethyl-disiloxane | 67.0 | 2.34 | 157.0 |
| Charge III | | | |
| Chloroplatinic acid[1] | | | 0.160 ml. (10 ppm) |

[1]Speier's catalyst, typically used at 5 to 10 parts per million of active platinum based on monomer solids.

Charge I was added at ambient temperatures to a four-necked round bottom flask of appropriate size equipped with a motor driven stainless steel paddle agitator, a thermocouple, a reflux condenser, and an inert gas blanket tube. Concurrent with the addition of Charge I, 20 to 25 parts per million of sodium acetate were added to inhibit undesirable possible side reactions. The temperature was gradually increased to 75° C. under a nitrogen blanket at 0.1 cubic feet/minute. Once at temperature, 5% of Charge II was added and the reaction mixture was stirred for five minutes. Charge III, the chloroplatinic acid catalyst solution, was then added to the reaction chamber. The reaction was allowed to exotherm to 95° C. and stabilize. The remainder of Charge II was added at a rate such that the temperature did not exceed 95° C. After complete addition of Charge II, the reaction temperature was maintained at 95° C. and monitored by infrared spectroscopy for the disappearance of the silicon hydride absorption band (Si—H, 2150 cm$^{-1}$). The copolymer thus prepared had an actual solids of about 94%; an OH value of 147.4; and a number average molecular weight ($M_n$) of 1985 and a weight average molecular weight ($M_w$) of 3963, as determined by gel permeation chromatography using a polystyrene standard.

Example 2

This example describes the preparation of a trimethylolpropane diallylether-tetramethyl disiloxane copolymer. No mono-unsaturated material was added with the trimethylolpropane diallylether of Charge I. The copolymer was prepared from the following mixture of ingredients:

| Ingredients | Equivalent Weight | Equivalents | Parts By Weight (grams) |
| --- | --- | --- | --- |
| Charge I: | | | |
| Trimethylolpropane diallylether | 107.0 | 2.34 | 250.0 |
| Charge II: | | | |
| 1,1,3,3-tetramethyl-disiloxane | 67.0 | 2.34 | 157.0 |
| Charge III: | | | |
| Chloroplatinic acid | | | 0.163 ml (10 ppm) |

Charge I was added at ambient temperatures to a four-necked round bottom flask of appropriate size equipped with a motor driven stainless steel paddle agitator, a thermocouple, a reflux condenser, and an inert gas blanket tube. Concurrent with the addition of Charge I, 20 to 25 parts per million of sodium acetate were added to inhibit the undesirable possible side reaction of acetal condensation via a propenyl ether moiety. The temperature was gradually increased to 75° C. under a nitrogen blanket at 0.1 cubic feet/minute. Once at temperature, 5% of Charge II was added and the reaction mixture was stirred for five minutes. Charge III, the chloroplatinic acid catalyst solution, was then added to the reaction chamber. The reaction was allowed to exotherm to 95° C. and stabilize. The remainder of Charge II was added at a rate such that the temperature did not exceed 95° C. After complete addition of Charge II, the reaction temperature was maintained at 95° C. and monitored by infrared spectroscopy for the disappearance of the silicon hydride absorption band (Si—H, 2150 cm$^{-1}$).

Example 3

This example describes the preparation of a divinyl benzene-tetramethyl disiloxane copolymer. The copolymer was prepared from the following mixture of ingredients:

| Ingredients | Equivalent Weight | Equivalents | Parts By Weight (grams) |
| --- | --- | --- | --- |
| Charge I: | | | |
| Divinyl benzene[1] | 65.0 (132.0) | 4.23 (1.71) | 500.0 |
| Charge II: | | | |
| 1,1,3,3-tetramethyl-disitoxane | 134.0 | 5.75 | 385.0 |
| Charge III: | | | |
| Chloroplatinic acid | | | 0.356 ml (10 ppm) |

[1]Contains 55% divinyl benzene and 45% ethylvinyl benzene as an impurity. In Charge I, parenthetical equivalent weight and equivalents are listed for the ethylvinyl benzene imputity.

Charge I was added at ambient temperatures to a four-necked round bottom flask of appropriate size equipped with a motor driven stainless steel paddle agitator, a thermocouple, a reflux condenser, and an inert gas blanket tube. The temperature was gradually increased to 75° C. under a nitrogen blanket at 0.1 cubic feet/minute. Once at temperature, 5% of Charge II was added and the reaction mixture was stirred for five minutes. Charge III, the chloroplatinic acid catalyst solution, was then added to the reaction chamber. The reaction was allowed to exotherm to 95° C. and stabilize. The remainder of Charge II was added at a rate such that the temperature did not exceed 95° C. After complete addition of Charge II, the reaction temperature was maintained at 95° C. and monitored by infrared spectroscopy for the disappearance of the silicon hydride absorption band (Si—H, 2150 cm$^{-1}$).

Example 4

This example describes the preparation of a styrene-polymethyl polysiloxane (i.e., MASILWAX 135) oligomer, via the hydrosilylation of the MASILWAX 135 polysiloxane which has an approximate degree of polymerization of 3 to 4, i.e., (Si—O)$_3$ to (Si—O)$_4$. The oligomer was prepared from the following mixture of ingredients:

| Ingredients | Equivalent Weight | Equivalents | Parts By Weight (grams) |
| --- | --- | --- | --- |
| Charge I: | | | |
| Styrene | 104.0 | 3.2 | 329.0 |
| Charge II: | | | |
| MASIL WAX 135[1] | 159.5 | 2.9 | 458.3 |
| Charge III: | | | |
| Chloroplatinic acid | | | 0.316 ml (10 ppm) |

[1]Polymethyl polysiloxane-containing silicon hydride, commercially available from PPG Industries, Inc.

Charge I was added at ambient temperatures to a four-necked round bottom flask of appropriate size equipped with a motor driven stainless steel paddle agitator, a thermocouple, a reflux condenser, and an inert gas blanket tube. The temperature was gradually increased to 75° C. under a nitrogen blanket at 0.1 cubic feet/minute. Once at temperature, 5% of Charge II was added and the reaction mixture was stirred for five minutes. Charge III, the chloroplatinic acid catalyst solution, was then added to the reaction chamber. The reaction was allowed to exotherm to 95° C. and stabilize. The remainder of Charge II was added at a rate such that the temperature did not exceed 95° C. After complete addition of Charge II, the reaction temperature was maintained at 95° C. and monitored by infrared spectroscopy for the disappearance of the silicon hydride absorption band (Si—H, 2150 cm$^{-1}$).

Example 5

This example describes the preparation of a trimethylolpropane monoallylether (TMPMAE)-MASIL WAX 135 copolymer from the following mixture of ingredients:

| Ingredients | Equivalent Weight | Equivalents | Parts By Weight (grams) |
| --- | --- | --- | --- |
| Charge I: | | | |
| Trimethylolpropane monoallylether | 174.0 | 7.7 | 1335.7 |
| Charge II: | | | |
| MASIL WAX 135 | 67.0 | 7.7 | 515.2 |
| Charge III: | | | |
| Chloroplatinic acid | | | 10 ppm |

To a suitable reaction vessel equipped with a means for maintaining a nitrogen blanket, Charge I and an amount of sodium acetate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

ELECTRODEPOSITABLE COATING COMPOSITIONS

Example AA

Pigment Grind Paste

This example describes the preparation of a pigment grind paste. The grind paste was prepared as described in Example II-A of U.S. Pat. No. 5,630,922 from the following ingredients:

| INGREDIENTS | WEIGHT (grams) |
|---|---|
| Grind resin[1] | 178.7 |
| Titanium dioxide[2] | 749.3 |
| Carbon black beads[3] | 20.0 |
| Catalyst paste[4] | 411.5 |
| Deionized water | 240.5 |

[1]A 54.5% resin solids quaternary grind resin as described in Example II-A of U.S. Pat. No. 5,630,922.
[2]Pigment commercially available as R900-39/76 from E. I. DuPont de Nemours and Co.
[3]Pigment commercially available as CSX-333 from Cabot Corp.
[4]Dibutyltin oxide catalyst paste prepared as described in Example II-A of U.S. Pat. No. 5,630,922.

Example AB

Cationic Electrodepositable Main Film-Forming Resin

This example describes the preparation of a cationic electrodepositable resin, the main film-forming polymer in the coating compositions of Examples A through F. The cationic resin was prepared from a mixture of the following ingredients:

| INGREDIENTS | PARTS BY WEIGHT |
|---|---|
| EPON 828[1] | 1019.25 |
| Bisphenol A-ethylene oxide 1/6 | 366.08 |
| Bisphenol A | 297.45 |
| Methyl isobutyl ketone | 88.65 |
| Benzyldimethylamine | 1.44 |
| Benzyldimethylamine | 4.28 |
| Crosslinker[3] | 1779.19 |
| Diketimine[2] | 112.28 |
| N-methylethanolamine | 98.42 |
| Sulfamic acid | 92.99 |

| INGREDIENTS | PARTS BY WEIGHT |
|---|---|
| Deionized water | 2167.23 |
| Deionized water | 1359.95 |
| Deionized water | 2137.07 |

[1]Diglycidyl ether of Bisphenol A from Shell Chemical Co.
[2]Diketimine derived from diethylene triamine and methyl isobutyl ketone (MIBK) (73% solids in MIBK).
[3]Capped polyisocyanate crosslinker prepared from the following mixture of ingredients:

| Ingredients | Parts by Weight |
|---|---|
| Polyisocyanate[a] | 4095.0 |
| Methyl isobutyl ketone | 2199.6 |
| Dibutyltin dilaurate | 6.2 |
| 2-(2-Butoxyethoxy)ethanol | 3353.0 |
| Trimethylolpropane | 356.1 |
| 2-(2-Butoxyethoxy)ethanol | 464.2 |

[a]Polymeric diphenylmethane diisocyanate available from Bayer Corp. as MONDUR MRS-4.

The polyisocyanate, methyl isobutyl ketone and dibutyltin dilaurate were charged to a reaction flask and heated under a nitrogen atmosphere to 30° C. The first portion of the 2-(2-butoxyethoxy)ethanol was added slowly while holding the temperature between 60° C. to 65° C. Upon completion of the addition, the reaction mixture was held at 65° C. for 90 minutes. The trimethylolpropane was then added and the mixture heated to 110° C. and held there for three hours whereupon the final portion of the 2-(2-butoxyethoxy) ethanol was added. The 110° C. hold was continued until infrared analysis indicated no unreacted NCO remained.

The EPON 828, Bisphenol A-ethylene oxide adduct, Bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for one-half hour, cooled further to 145° C. and the second portion of benzyldimethylamine added. The reaction was held at 145° C. until a reduced Gardner-Holdt viscosity (50 percent resin solids in 2-methoxypropanol) of P+ was obtained. At this point, the crosslinker, the diketimine and N-methylethanolamine were added in succession. The reaction was then completed during a hold of one hour at 125° C. The mixture was then dispersed by pouring it into an agitated mixture of sulfamic acid and the first portion of deionized water. The dispersion was further thinned in stages with the second and third portions of deionized water and vacuum stripped to remove organic solvent, yielding a final dispersion of 43.7 percent solids and a particle size of 963 Angstroms.

Example A

This example describes the preparation of a cationic electrodepositable coating composition in the form of an electrocoating bath which contains the trimethylolpropane diallylether (TMPDAE)-tetramethyl disiloxane (TMDS) copolymer of Example 2. The coating composition was prepared from a mixture of the following ingredients:

| INGREDIENTS | WEIGHT (grams) |
|---|---|
| Cationic film-forming resin of Example AB | 925.1 |
| Solvent[1] | 17.0 |
| Pigment grind paste of Example AA | 80.9 |
| TMPDAE-TMDS copolymer of Example 2[2] | 3.3 |
| Deionized water | 1173.7 |

[1]Reaction product of 2 moles of diethylene glycol butyl ether and 1 mole of formaldehyde, 98% active, prepared as described in U.S. Pat. No. 4,891,111 to McCollum, et al.
[2]50% solution in ethylene glycol monobutylether.

Example B

This example describes the preparation of a cationic electrodepositable coating composition in the form of an electrocoating bath which contains the divinyl benzene (DVB)-TMDS copolymer of Example 3. The coating composition was prepared from a mixture of the following ingredients:

| INGREDIENTS | WEIGHT (grams) |
|---|---|
| Cationic film-forming resin of Example AB | 925.1 |
| Solvent of Example A | 17.0 |
| Pigment grind paste of Example AA | 80.9 |
| DVB-TMDS copolymer of Example 3[1] | 2.40 |
| Deionized water | 1174.6 |

[1]70% solution in ethylene glycol monobutylether.

Example C

This example describes the preparation of a cationic electrodepositable coating composition in the form of an electrocoating bath which contains the styrene-MASIL WAX 135 oligomer of Example 4. The coating composition was prepared from a mixture of the following ingredients:

| INGREDIENTS | WEIGHT (grams) |
|---|---|
| Cationic film-forming resin of Example AB | 925.1 |
| Solvent of Example A | 17.0 |
| Pigment grind paste of Example AA | 80.9 |
| Styrene-MASIL WAX oligomer of Example 4 | 1.70 |
| Deionized water | 1175.4 |

Example D

This example describes the preparation of a cationic electrodepositable coating composition in the form of an electrocoating bath which contains the triethylolpropane monoallylether-MASIL WAX 135 oligomer of Example 5. The coating composition was prepared from a mixture of the following ingredients:

| INGREDIENTS | WEIGHT (grams) |
|---|---|
| Cationic film-forming resin of Example AB | 925.1 |
| Solvent of Example A | 17.0 |
| Pigment grind paste of Example AA | 80.9 |
| TMPMAE-TMDS oligomer of Example 5[1] | 3.3 |
| Deionized water | 1173.7 |

[1]50% solution in ethylene glycol monobutylether.

Comparative Example E

This comparative example describes the preparation of a cationic electrodepositable coating composition in the form of an electrocoating bath which contains a commercially available silicone oil as a crater control agent. The coating composition was prepared from a mixture of the following ingredients:

| INGREDIENTS | WEIGHT (grams) |
|---|---|
| Cationic film-forming resin of Example AB | 928.4 |
| Solvent of Example A | 17.0 |
| Pigment grind paste of Example AA | 80.9 |
| SILWET L7602[1] | 0.44 |
| Deionized water | 1173.2 |

[1]Silicone oil commercially available from OSi Specialties, a subsidiary of Whitco Corp., 50% solution in ethylene glycol monobutylether.

Comparative Example F

This comparative example describes the preparation of a cationic electrodepositable coating composition in the form of an electrocoating bath which contains no crater control agent. The coating composition was prepared from a mixture of the following ingredients:

| INGREDIENTS | WEIGHT (grams) |
|---|---|
| Cationic film-forming resin of Example AB | 929.1 |
| Solvent of Example A | 17.0 |
| Pigriient grind paste of Example AA | 80.9 |
| Deionized water | 1173.0 |

Example G

This example describes the preparation of an anionic electrodepositable coating composition in the form of an electrocoating bath which contains as a crater control agent the trimethylolpropane monoallylether-MASIL WAX 135 oligomer of Example 5. The coating composition was prepared from a mixture of the following ingredients:

| INGREDIENTS | WEIGHT (grams) |
|---|---|
| AR-210[1] | 157.0 |
| AP-274[2] | 88.0 |

-continued

| INGREDIENTS | WEIGHT (grams) |
|---|---|
| TMPMAE-TMDS oligomer of Example 5[3] | 2.7 |
| Deionized water | 1809.0 |

[1]Resin feed component of an anionic acrylic electrocoating composition commercially available from PPG Industries, Inc. as POWERCRON ® 210.
[2]Pigment paste component of an anionic acrylic electrocoating composition commercially available from PPG Industries, Inc. as POWERCRON ® 210.
[3]50% solution in ethylene glycol monobutylether.

Comparative Example H

This comparative example describes the preparation of an anionic electrodepositable coating composition in the form of an electrocoating bath which contains no crater control agent. The coating composition was prepared from a mixture of the following ingredients:

| INGREDIENTS | WEIGHT (grams) |
|---|---|
| AR-210 | 157.0 |
| AP-274 | 88.0 |
| Deionized water | 1809.0 |

Bath Preparation
Cationic Electrocoating Bath Preparation:

Each of the above electrodepositable coating compositions of Examples A through F were prepared in the form of a cationic electrocoating bath in the following manner. The solvent was added under moderate agitation to the resin and mixed for approximately 20 minutes. A premix was made by adding under agitation the crater control agent to the pigment grind paste of Example AA and stirring for about 5 minutes. Subsequently, the premix was diluted with 10% by weight of the total deionized water and the diluted premix was then added to the solvent-thinned resin. The remaining amount of water was added to this mixture. Each of the resulting electrocoating baths had final bath solids of 21% with a pigment to binder ratio of 0.11:1.

Anionic Electrocoating Bath Preparation:

Each of the above electrodepositable coating compositions of Example G and Comparative Example H were prepared in the form of an anionic electrocoating bath in the following manner. Under moderate agitation, 10 grams of deionized water and, when used, the polysiloxane crater control agent, was added to the AP274 pigment paste component of POWERCRON®210, an anionic acrylic electrodepositable coating composition commercially available from PPG Industries, Inc. This admix was then added to the AR210 resin component of POWERCRON®210. The remainder of the deionized water was slowly added to this resin/paste admix to yield an anionic electrodeposition bath having about 9% solids at a 0.44:1 pigment-to-binder ratio.

Electrocoating Procedure:

Each of the above-described electrodepositable coating compositions, in the form of an electrocoating bath prepared as described immediately above, were eletrodeposited onto cold rolled steel substrate which had been pretreated with a zinc phosphate pretreatment followed by a chrome rinse, commercially available as B958/P60 from Parker-Amchem (now Henkel). Conditions for cationic electrodeposition for each of the above-described cationic coating compositions of Examples A through F were 2 minutes at 90° F. (32.2° C.) at 205 volts to yield a cured film thickness of about 0.9 to 1.0 mils. These electrocoated substrates were subsequently cured in an electric oven at 340° F. (171.1° C.) for 30 minutes. Conditions for anionic electrodeposition for each of the above described anionic coating compositions of Examples G and H were 90 seconds at 90° F. (32.2° C.) at 115 volts to yield a cured film thickness of about 0.7 to 0.8 mils. These electrocoated substrates were cured at a temperature of 300° F. (148.9° C.) for 20 minutes.

Testing Procedures:

The cured electrodeposited coating compositions were evaluated for a variety of performance properties to include oil spot resistance, topcoat adhesion and solvent wipe telegraphing resistance.

Oil spot contamination resistance testing evaluates the ability of an electrodeposited coating to resist crater formation upon cure. Panels were tested for oil spot resistance by contamination with oils typically used for chain lubrication in automobile assembly plants. For the cationic electrodepositable coating compositions of Examples A through F, the top one-half of B958/P60 substrate test panels were spotted with TRIBOL-ICO medium oil and the bottom one-half was spotted with LUBECON ATS oil. The oil-spotted test panels were then electrocoated and cured as described above for the cationic electrodepositable coating compositions. Results are recorded in the following Table 1. For the anionic electrodepositable coating compositions of Examples G and H, the following procedure was followed for oil spot resistance testing. After electrocoating the test panels as described above for Examples G and H, the panels were allowed to dry at ambient temperatures for about 10 minutes. At that time, the top half of each panel was spotted with TRIBOL-ICO medium oil and the bottom half with LUBECON ATS oil. The oil-contaminated electrocoated panels were then cured as described above for the anionic electrocoating compositions. Results are recorded in the following Table 2.

For topcoat adhesion testing, panels were electrocoated and cured as described above. Within 30 minutes of cure, a white topcoat, commercially available from PPG Industries, Inc. as C354/W404, was applied using a stainless steel wirewound draw bar and cured for 30 minutes at 300° F.(148.9 ° C.) to a cured film thickness of about 1.3 to 1.5 mils. Within 10 minutes of the topcoat cure, cross-hatch adhesion (topcoat to electrocoat) was tested in accordance with ASTM D3359, Method B. Adhesion results were rated according to ASTM specifications and results were reported in the following Table 1.

Solvent wipe telegraphing resistance testing indicates the ability of a cured electrocoating to resist the telegraphing through a subsequently applied primer or other topcoat the areas of an electrocoated substrate which were required to be wiped with a clean-up solvent prior to application of the primer or topcoat. This test also indicates the "wettability" of the solvent-wiped electrocoating by subsequently applied primers or topcoats. "Wettability" is a term used to describe the ability of an electrocoating which has been wiped with clean-up solvent to be wetted or recoated uniformly with primer or topcoat which is subsequently applied to the cured electrocoating.

Panels were electrocoated with the above-described electrodepositable coating compositions and cured under conditions as described above. A xylene dampened cloth was used to wipe the letter "Z" on the cured electrocoat film of each test panel, and the xylene was allowed to flash for about 1 minute. A black primer available from PPG Industries, Inc.(PPG-GMBH) as 73260 was then applied with a stainless steel wirewound draw bar and the primer was cured for 30 minutes at 325° F. (148.6° C.) to provide a cured primer film thickness of about 0.25 to 0.50 mils. The degree of telegraphing of the letter "Z" through the black primer and the "wettability" of the solvent-wiped electrocoating by the black primer were rated by visual inspection accordingly. Results are reported in the following Table 1.

TABLE 1

| Example # | Oil Spot[1] | Topcoat Adhesion[2] | Solvent Telegraph | Wettability |
|---|---|---|---|---|
| A | 5 | 5B | Slight | Good |
| B | 5 | 5B | Slight | Good |
| C | 1–2 | 5B | Slight | Good |
| D | 9 | 5B | None | Good |
| E* | 6 | 0B | Severe | Poor |
| F* | 0 | 4B | Slight | Good |

[1]10 = best, 0 = worst.
[2]5B = 100% adhesion, 0B = 0% adhesion.
*Comparative examples.

TABLE 2

| Example # | Oil Spot[1] |
|---|---|
| G | 8 |
| H (comparative) | 4 |

[1]10 = best; 0 = worst.

We claim:

1. An electrodepositable coating composition comprising a resinous phase dispersed in an aqueous medium, said resinous phase comprising the following:

(a) an ionic electrodepositable resin, a crosslinker for the ionic electrodepositable resin; and (b) a polysiloxane which is the ungelled reaction product of the following reactants:

(i) a polysiloxane containing silicon hydride represented by the general formula:

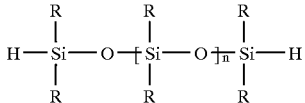

wherein the R groups are monovalent hydrocarbon groups connected to the silicon atoms, and n is 0 to 100; and (ii) at least one organic material which contains two or more unsaturated bonds capable of undergoing hydrosilylation reaction, wherein said electrodepositable coating composition is curable by heat.

2. The electrodepositable coating composition of claim 1 wherein reactant (ii) is represented by the general formula: $R_1$—X wherein $R_1$ is selected from the group consisting of alkenyl, oxyalkenyl, and alkenyl aryl; and X is a group represented by the general formula: O—Y wherein Y is a group represented by the general formula:

where p is 1, and

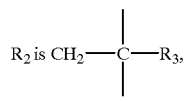

where $R_3$ is a group containing one or more unsaturated bonds capable of undergoing hydrosilylation reaction.

3. The electrodepositable coating composition of claim 1 wherein at least two of the unsaturated bonds are in the terminal position.

4. The electrodepositable coating composition of claim 3 wherein reactant (ii) is a compound selected from the group consisting of trimethylolpropane diallylether, divinyl benzene, pentaerythritol diallylether, trimethylpentane diol diallylether, 3,9,-divinyl-2,4,8,10-tetraoxaspiro[5.5] undecane and mixtures thereof.

5. The electrodepositable coating composition of claim 1 wherein n is 0 to 5.

6. The electrodepositable coating composition of claim 1 wherein the ionic electrodepositable resin (a) is capable of deposition on a cathode.

7. The electrodepositable coating composition of claim 1 in the form of an electrodeposition bath wherein the polysiloxane (b) is present in an amount of about 50 parts per million to about 1500 parts per million, based on electrodeposition bath weight.

8. A method of electrocoating a conductive substrate serving as a charged electrode in an electrical circuit comprising said electrode and an oppositely charged counter electrode, said electrodes being immersed in an aqueous electrocoating composition, comprising passing electric current between said electrodes to cause the deposition of the electrocoating composition on the substrate as a substantially continuous film, and heating said substrate to cure the film deposited thereon, said electrocoating composition comprising a resinous phase dispersed in an aqueous medium, said resinous phase comprising the following:

(a) an ionic electrodepositable resin, a crosslinker for the ionic electrodepositable resin; and (b) a polysiloxane which is the ungelled reaction product of the following reactants:

(i) a polysiloxane containing silicon hydride represented by the general formula:

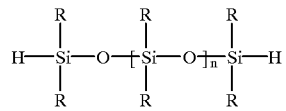

wherein the R groups are monovalent hydrocarbon groups connected to the silicon atoms, and n is 0 to 100; and (ii) at least one material which contains one or more unsaturated bonds capable of undergoing hydrosilylation reaction, wherein said electrocoating composition is heat-curable.

9. The method according to claim 8 wherein reactant (ii) is represented by the general formula:

$R_1$—X wherein $R_1$ is selected from the group consisting of alkenyl, oxyalkenyl, and alkenyl aryl; and X is a group represented by the general formula: O—Y wherein Y is a group represented by the general formula:

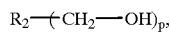

where p is 1,

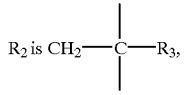

and where $R_3$ is a group containing one or more unsaturated bonds capable of undergoing hydrosilylation reaction.

10. The method according to claim 8 wherein reactant (ii) contains at least two unsaturated bonds capable of undergoing hydrosilylation reaction.

11. The method according to claim 10 wherein at least two of the unsaturated bonds are in the terminal position.

12. The method according to claim 11 wherein reactant (ii) is a compound selected from the group consisting of trimethylolpropane diallylether, divinyl benzene, pentaerythritol diallylether, trimethylpentane diol diallylether, 3,9,-divinyl-2,4,8,10-tetraoxaspiro[5.5]undecane and mixtures thereof.

13. The method according to claim 8 wherein n is 0 to 5.

14. A method for coating a conductive substrate serving as a cathode in an electrical circuit comprising said cathode and an anode immersed in an aqueous cationic electrocoating composition comprising passing electric current between said anode and said cathode so as to cause the electrocoating composition to deposit as a coating on the cathode, and heating said substrate to cure the coating deposited thereon, characterized in that said electrocoating composition is a cationic electrocoating composition comprising a resinous phase dispersed in an aqueous medium, said resinous phase comprising the following:

(a) a cationic electrodepositable resin, a crosslinker for the ionic electrodepositable resin; and (b) a polysiloxane which is the ungelled reaction product of the following reactants:

(i) a polysiloxane containing silicon hydride represented by the general formula:

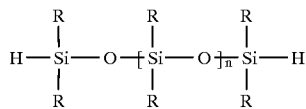

wherein the R groups are monovalent hydrocarbon groups connected to the silicon atoms, and n is 0 to 100; and (ii) at least one material which contains one or more unsaturated bonds capable of undergoing hydrosilylation reaction, wherein said cationic electrocoating composition is heat-curable.

15. The method according to claim 14 wherein reactant (ii) is represented by the general formula: $R_1$—X wherein $R_1$ is selected from the group consisting of alkenyl, oxyalkenyl, and alkenyl aryl; and X is a group represented by the general formula: O—Y wherein Y is a group represented by the general formula:

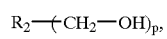

where p is 1,

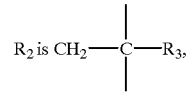

and where $R_3$ is a group containing one or more unsaturated bonds capable of undergoing hydrosilylation reaction.

16. The method according to claim 14 wherein reactant (ii) contains at least two unsaturated bonds capable of undergoing hydrosilylation reaction.

17. The method according to claim 16 wherein at least two of the unsaturated bonds are in the terminal position.

18. The method according to claim 17 wherein reactant (ii) is a compound selected from the group consisting of trimethylolpropane diallylether, divinyl benzene, pentaerythritol diallylether, trimethylpentane diol diallylether, 3,9,-divinyl-2,4,8,10-tetraoxaspiro[5.5]undecane and mixtures thereof.

19. The method according to claim 14 wherein n is 0 to 5.

20. A polysiloxane which is the ungelled reaction product of the following reactants:

(a) a polysiloxane containing silicon hydride represented by the general formula:

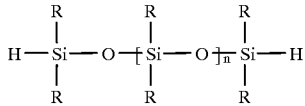

wherein the R groups are monovalent hydrocarbon groups connected to the silicon atoms, and n is 0 to 5; and (b) at least one organic material which contains two or more unsaturated bonds capable of undergoing hydrosilylation reaction.

21. The polysiloxane of claim 20 wherein at least two of the unsaturated bonds are in the terminal position.

22. The polysiloxane of claim 21 wherein reactant (b) is represented by the general formula: $R_1$—X wherein $R_1$ is selected from the group consisting of alkenyl, oxyalkenyl, and alkenyl aryl; and X is group which contains one or more unsaturated bonds capable of undergoing hydrosilylation reaction.

23. The polysiloxane of claim 22 wherein X is a group represented by the general formula: O—Y wherein Y is a group represented by the general formula:

where p is 1, and

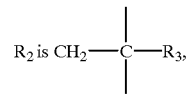

where $R_3$ is a group containing one or more unsaturated bonds capable of undergoing hydrosilylation reaction.

24. The polysiloxane of claim 23 wherein $R_3$ is a group containing at least one unsaturated bond in the terminal position.

* * * * *